(12) United States Patent
Lim et al.

(10) Patent No.: US 11,870,888 B2
(45) Date of Patent: Jan. 9, 2024

(54) IMMOBILIZER TOKEN MANAGEMENT SYSTEM

(71) Applicant: Samsung Electronics Co., Ltd., Gyeonggi-do (KR)

(72) Inventors: Taehyung Lim, Gyeonggi-do (KR);
Inyoung Shin, Gyeonggi-do (KR);
Sooyeon Jung, Gyeonggi-do (KR);
Jonghyo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 249 days.

(21) Appl. No.: 17/290,367

(22) PCT Filed: Oct. 28, 2019

(86) PCT No.: PCT/KR2019/014247
§ 371 (c)(1),
(2) Date: Apr. 30, 2021

(87) PCT Pub. No.: WO2020/091330
PCT Pub. Date: May 7, 2020

(65) Prior Publication Data
US 2021/0409200 A1 Dec. 30, 2021

(30) Foreign Application Priority Data
Nov. 2, 2018 (KR) .................. 10-2018-0133961

(51) Int. Cl.
*H04L 29/06* (2006.01)
*H04L 9/08* (2006.01)
*H04L 9/32* (2006.01)

(52) U.S. Cl.
CPC ............ *H04L 9/0825* (2013.01); *H04L 9/085* (2013.01); *H04L 9/3213* (2013.01); *H04L 2209/84* (2013.01)

(58) Field of Classification Search
CPC ..... H04L 9/0825; H04L 9/085; H04L 9/3213; H04L 2209/84
See application file for complete search history.

(56) References Cited

U.S. PATENT DOCUMENTS 8,775,810 B1 7/2014 Snodgrass et al.
8,841,987 B1 9/2014 Stanfield et al.
(Continued)

FOREIGN PATENT DOCUMENTS

CN 105553654 5/2016
CN 106104532 11/2016
(Continued)

OTHER PUBLICATIONS

Tillich, Stefan, and Marcin Wójcik. "Security analysis of an open car immobilizer protocol stack." Trusted Systems: 4th International Conference, INTRUST 2012, London, UK, Dec. 17-18, 2012. Proceedings 4. Springer Berlin Heidelberg, 2012. (Year: 2012).*

(Continued)

*Primary Examiner* — Shawnchoy Rahman
(74) *Attorney, Agent, or Firm* — The Farrell Law Firm, P.C.

(57) ABSTRACT

The present disclosure relates to an immobilizer token management system, and an embodiment may include generating immobilizer token indices, generating a digital key according to a request for the issuance of a digital key received from a digital key sharing device, mapping the digital key to one of the immobilizer token indices, and transmitting, to the digital key sharing device, the digital key and the immobilizer token index mapped to the digital key.

6 Claims, 12 Drawing Sheets

(56) References Cited

U.S. PATENT DOCUMENTS

| | | |
|---|---|---|
| 9,911,255 B2 | 3/2018 | Lee |
| 9,947,153 B2 | 4/2018 | Bergerhoff et al. |
| 2017/0004141 A1 | 1/2017 | Davenport et al. |
| 2017/0186251 A1 | 6/2017 | Lee |

FOREIGN PATENT DOCUMENTS

| | | | | |
|---|---|---|---|---|
| EP | 2 743 868 | 12/2012 | | |
| KR | 1020100049885 | 5/2010 | | |
| KR | 1020140022490 | 2/2014 | | |
| KR | 1020170077328 | 7/2017 | | |
| KR | 1020180005095 | 1/2018 | | |
| WO | WO 2017/118587 | 7/2017 | | |
| WO | WO 2017/207680 | 12/2017 | | |
| WO | WO-2018160863 A1 * | 9/2018 | ......... | H04L 63/0823 |

OTHER PUBLICATIONS

International Search Report dated Feb. 10, 2020 issued in counterpart application No. PCT/KR2019/014247, 16 pages.
European Search Report dated Oct. 27, 2021 issued in counterpart application No. 19879302.8-1218, 8 pages.
Korean Office Action dated Sep. 8, 2023 issued in counterpart application No. 10-2018-0133961, 13 pages.
Chinese Office Action dated Sep. 29, 2023 issued in counterpart application No. 201980072871.5, 21 pages.

* cited by examiner

US 11,870,888 B2

IMMOBILIZER TOKEN MANAGEMENT SYSTEM

PRIORITY

This application is a National Phase Entry of PCT International Application No. PCT/KR2019/014247, which was filed on Oct. 28, 2019, and claims priority to Korean Patent Application No. 10-2018-0133961, which was filed on Nov. 2, 2018, the entire content of each of which is incorporated herein by reference.

TECHNICAL FIELD

The present disclosure relates to an immobilizer token management system, and more particularly, to a method and apparatus for generating, using, and deleting an immobilizer token.

BACKGROUND ART

With the distribution of personalized electronic devices such as smartphones and tablet PCs, technologies for performing security and authentication by using digital keys have been developed. As one solution of the digital key technology, a technology in which a digital key is integrated into a mobile device, for example, a smartphone, by using a wireless communication technology has been developed. A digitized virtual key, that is, a digital key, may be inserted into a mobile device, and a user of the mobile device may substitute the digital key for a conventional physical key, for opening/closing doors of a vehicle, or controlling and accessing the vehicle.

Meanwhile, an immobilizer is an anti-theft system for a vehicle, which is capable of allowing a vehicle to be started up only when information stored in the vehicle matches a password embedded in a key. Immobilizers have been applied to vehicles since 1990s, and are currently being applied to most vehicles to prevent theft.

The immobilizer is an essential system for starting up a vehicle, and needs to be included in a digital key even when a physical key is substituted with a digital key. Therefore, a system for applying an immobilizer to a digital key and managing the applied immobilizer is required.

DESCRIPTION OF EMBODIMENTS

Technical Problem

The present disclosure provides an immobilizer token management system. More particularly, the present disclosure provides a method and a device for generating, using, and deleting an immobilizer token.

Solution to Problem

According to an embodiment, an operation method of an owner device may include generating immobilizer token indices, generating a digital key according to a request for the issuance of a digital key received from a digital key sharing device, mapping the digital key to one of the immobilizer token indices, and transmitting, to the digital key sharing device, the digital key and the immobilizer token index mapped to the digital key.

According to an embodiment, the generating of the immobilizer token indices may include generating the immobilizer token indices of which number is identical to the maximum number of available immobilizer tokens.

According to an embodiment, the mapping of the digital key to one of the immobilizer token indices may include mapping the digital key to an immobilizer token index that is not matched with any digital key and thus is available.

According to an embodiment, the transmitting of the digital key and the immobilizer token index mapped to the digital key, to the digital key sharing device may include transmitting a validation means for validating the digital key in a vehicle.

According to an embodiment, the operation method may further include deleting an immobilizer token index mapped to an immobilizer token corresponding to an authorization to use the vehicle that is to be revoked, and adding a new immobilizer token index that is incremented by 1 from the highest immobilizer token index.

According to an embodiment, an operation method of a vehicle may include generating immobilizer token indices, receiving, from a digital key sharing device, a digital key and a request for an authorization to use the vehicle, validating the received digital key, and, in a case where the received digital key is valid, transmitting, to the digital key sharing device, an authorization to use the vehicle, and an immobilizer token corresponding to an immobilizer token index mapped to the received digital key.

According to an embodiment, the generating of the immobilizer token indices may include generating the immobilizer token indices of which number is identical to the maximum number of available immobilizer tokens.

According to an embodiment, the method may further include receiving, from the owner device, a validation means for validating a digital key, and the validating of the received digital key may include verifying whether the digital key is valid by using the received validation means.

According to an embodiment, the transmitting, to the digital key sharing device, of the authorization to use the vehicle, and the immobilizer token corresponding to the immobilizer token index mapped to the received digital key, may include confirming the immobilizer token index mapped to the received digital key, and mapping, to the digital key sharing device, the immobilizer token corresponding to the immobilizer token index mapped to the received digital key.

According to an embodiment, the transmitting, to the digital key sharing device, of the authorization to use the vehicle, and the immobilizer token corresponding to the immobilizer token index mapped to the received digital key, may include transmitting, to the digital key sharing device, the authorization to use the vehicle, receiving, from the digital key sharing device, a request for the issuance of an immobilizer token based on the authorization to use the vehicle, and transmitting the immobilizer token corresponding to the immobilizer token index mapped to the received digital key, according to the request for the issuance of an immobilizer token.

According to an embodiment, the method may further include obtaining the immobilizer token corresponding to the immobilizer token index, and the obtaining of the immobilizer token corresponding to the immobilizer token index may include generating the immobilizer token by the vehicle, or receiving the immobilizer token from a server, and mapping the generated or received immobilizer token to the immobilizer token index.

According to an embodiment, the obtaining of the immobilizer token corresponding to the immobilizer token index may include obtaining the immobilizer token corresponding to the immobilizer token index, in response to the request for the issuance of an immobilizer token being received from the digital key sharing device.

According to an embodiment, the method may further include deleting an immobilizer token index mapped to an immobilizer token corresponding to an authorization to use the vehicle that is to be revoked, and adding a new immobilizer token index that is incremented by 1 from the highest immobilizer token index.

According to an embodiment, the method may further include deleting the immobilizer token corresponding to the authorization to use the vehicle that is to be revoked.

According to an embodiment, the method may further include receiving, from the digital key sharing device, a request to start up the vehicle, and the immobilizer token, validating the immobilizer token, and, in a case where the immobilizer token is valid, starting up the vehicle.

According to an embodiment, the validating of the immobilizer token may include validating the immobilizer token received from the digital key sharing device by comparing the immobilizer token with a corresponding immobilizer token stored in the vehicle, or by performing a validation algorithm stored in the vehicle.

According to an embodiment, an owner device may include a transceiver, a memory storing a program and data for managing immobilizer tokens, and a processor configured to execute the program stored in the memory to generate immobilizer token indices, generate a digital key according to a request for the issuance of a digital key, received from a digital key sharing device, map the digital key to one of the immobilizer token indices, and transmit, to the digital key sharing device, the digital key and the immobilizer token index mapped to the digital key.

According to an embodiment, a vehicle may include a transceiver, a memory storing a program and data for managing immobilizer tokens, and a processor configured to execute the program stored in the memory to generate immobilizer token indices, receive, from a digital key sharing device, a digital key and a request for an authorization to use the vehicle, validate the received digital key, and, in a case where the received digital key is valid, transmit, to the digital key sharing device, an authorization to use the vehicle, and an immobilizer token corresponding to the immobilizer token index mapped to the received digital key.

According to an embodiment, a computer program product may include a computer-readable recording medium having stored therein a program for performing an operation of an owner device.

According to an embodiment, a computer program product may include a computer-readable recording medium having stored therein a program for performing an operation of a vehicle.

BEST MODE

Figure 1:
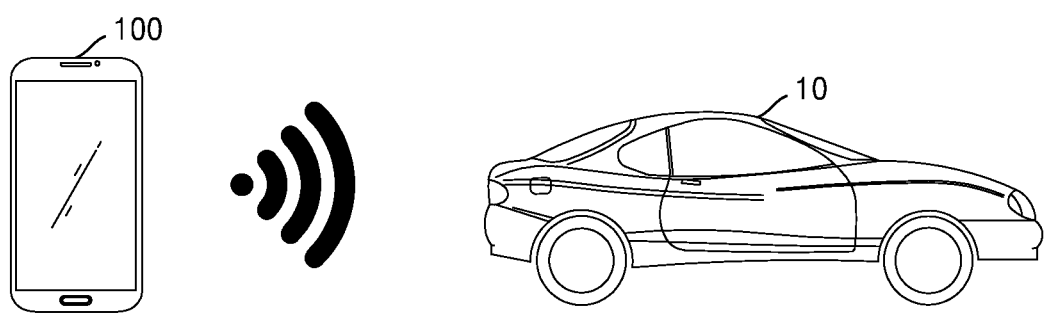
FIG. 1 is a diagram illustrating an environment in which a digital key is applicable according to an embodiment.

According to an embodiment, an operation method of an owner device may include generating immobilizer token indices, generating a digital key according to a request for the issuance of a digital key received from a digital key sharing device, mapping the digital key to one of the immobilizer token indices, and transmitting, to the digital key sharing device, the digital key and the immobilizer token index mapped to the digital key.

Mode of Disclosure

Hereinafter, embodiments of the present disclosure will be described in detail with reference to the accompanying drawings such that one of skill in the art may easily implement the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

Some embodiments of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the present disclosure may be implemented in various programming or scripting languages. The functional blocks may be implemented by algorithms executed in one or more processors. In addition, the present disclosure may employ conventional techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit" and "module" described in the present specification denote a unit that processes at least one function or operation, which may be implemented in hardware or software, or implemented in a combination of hardware and software. The "unit" or "module" may be stored in an addressable storage medium, and may be implemented by a program executable by a processor.

For example, the "unit" or "module" may be implemented by components such as software components, object-oriented software components, class components, and task components, and processes, functions, attributes, procedures, subroutines, segments of program code, drivers, firmware, micro codes, circuits, data, a database, data structures, tables, arrays, and variables.

FIG. 1 is a diagram illustrating an environment in which a digital key is applicable.

Referring to FIG. 1, an electronic device 100, and a vehicle 10 which is a target device to be controlled and accessed by using a digital key stored in the electronic device 100, are illustrated.

The electronic device 100 may include a personalized mobile device, but is not limited thereto, and may be any one of various types of electronic devices. For example, the electronic device 100 may be a smart phone, a tablet PC, a laptop computer, a PC, a camera, a wearable device, or the like. The electronic device 100 may store a digital key. In addition, the electronic device 100 may perform processes of generating, using, deleting, and managing a digital key. In an embodiment according to the present disclosure, the electronic device 100 may store an immobilizer token, with a digital key, for starting up the vehicle 10. Furthermore, the electronic device 100 may operate an immobilizer system, and manage immobilizer tokens for accessing an immobilizer mounted on the vehicle 10. More particularly, the electronic device 100 may generate, use, and delete immobilizer tokens.

The vehicle 10 refers to an automobile having a prime mover mounted thereon to move itself, and may include a two-wheel vehicle, an electric vehicle, or the like. The vehicle 10 may interact with the electronic device 100 to be controlled and accessed through a digital key. More particularly, the vehicle 10 may generate a digital key through interaction with the electronic device 100, and may be controlled in various manners by using a digital key stored in the electronic device 100. For example, a user may open or close doors of the vehicle 10 by using the digital key stored in the electronic device 100, and may control various electronic devices mounted on the vehicle 10. In addition, autonomous driving-related operations of the vehicle 10, such as an automated parking system may be controlled. In an embodiment, the vehicle 10 may be equipped with an immobilizer, and may perform management of immobilizer tokens.

In an embodiment according to the present disclosure, in order to use the vehicle 10, a digital key to verify an authorization to use the vehicle 10, and an immobilizer token to start up the vehicle 10 may be required. In the present disclosure, it is assumed that there has already been technologies for processing the generation, use, deletion, and management of a digital key for verifying an authorization to use the vehicle 10, and an immobilizer token management system, that is, a method and a device for generating, using, and deleting an immobilizer token will be described. Furthermore, in the present disclosure, a method and a device for managing an immobilizer token, such that an owner of the vehicle 10 may allow another user to use the vehicle 10 will be described.

Figure 2:
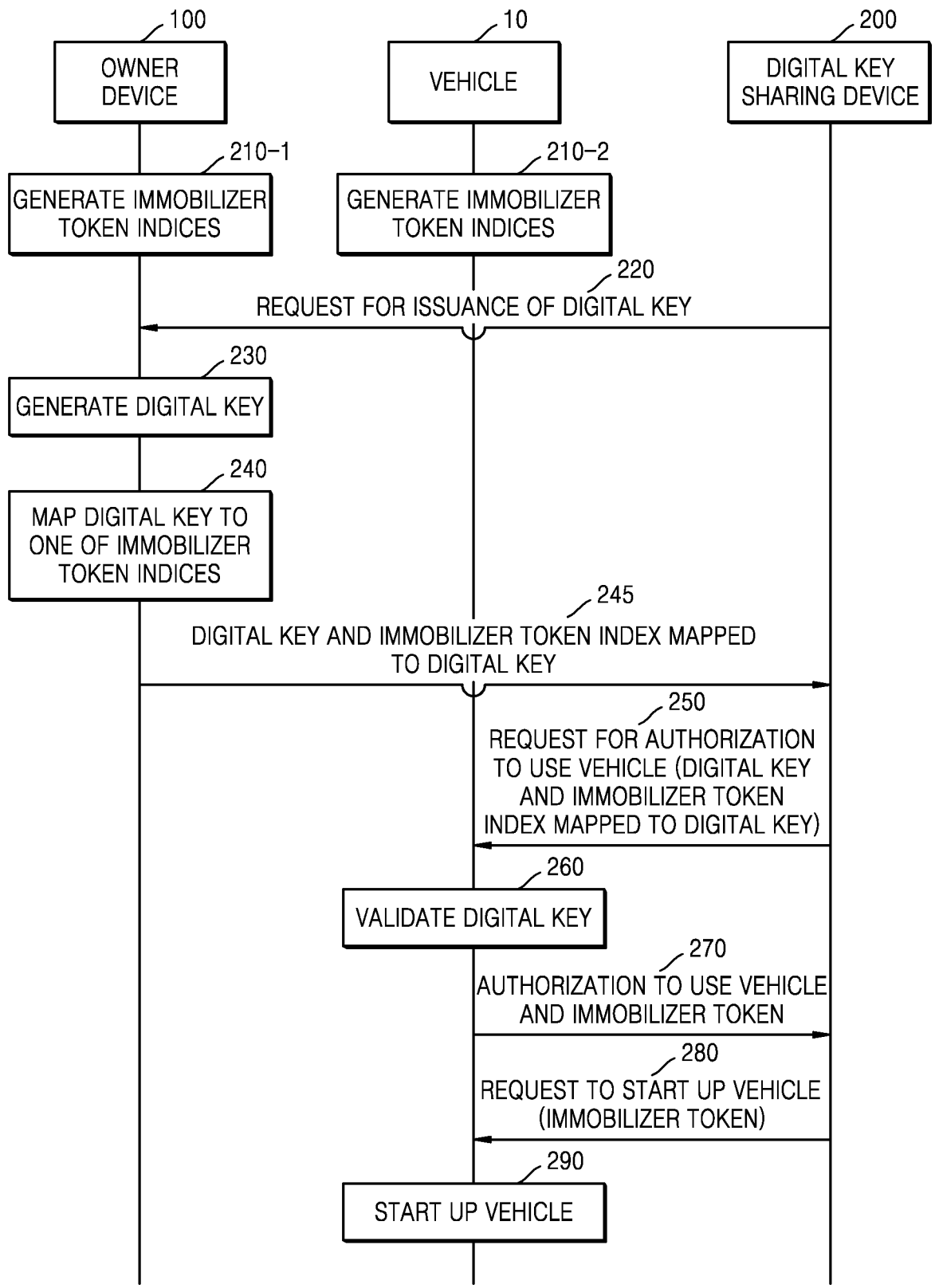
FIG. 2 is a flowchart of a method of generating and using an immobilizer token, according to an embodiment.

FIG. 2 is a flowchart of a method of generating and using an immobilizer token, according to an embodiment.

FIG. 2 illustrates a method of generating and using an immobilizer token, with interactions between an owner device 100, a vehicle 10, and a digital key sharing device 200. Here, the owner device 100 is an electronic device of an owner who owns the vehicle 10, and the digital key sharing device 200 is an electronic device of another user whom the owner of the vehicle 10 has allowed to use the vehicle 10.

First, in operations 210-1 and 210-2, the owner device 100 and the vehicle 10 may generate immobilizer token indices, respectively. Because each of the owner device 100 and the vehicle 10 may generate the immobilizer token indices, the immobilizer token indices of the owner device 100 and the vehicle 10 may exist separately from each other. In an embodiment according to the present disclosure, the numbers of the immobilizer token index indices generated by the owner device 100 and the vehicle 10 may be identical to the maximum number of available immobilizer tokens.

Then, in operation 220, the owner device 100 may receive a request for the issuance of a digital key, from the digital key sharing device 200. The owner device 100, which is owned by the owner of the vehicle 10, may receive the request for the issuance of a digital key, from the digital key sharing device 200, and then determine whether to issue a digital key, thereby determining whether to grant an authorization to use the vehicle 10 to the another user, who is a user of the digital key sharing device 200.

In operation 230, in a case where the owner device 100 has determined to issue a digital key in response to the request for the issuance of a digital key received from the digital key sharing device 200, the owner device 100 may generate a digital key, In an embodiment according to the present disclosure, the digital key may include identification information for identifying the digital key sharing device 200 or the user of the digital key sharing device 200, such that to whom the digital key has been issued may be identified.

Then, in operation 240, the owner device 100 may map the generated digital key to one of the immobilizer token indices. In an embodiment according to the present disclosure, the owner device 100 may map the digital key to an immobilizer token index that is not matched with any digital key and thus is available.

In operation 245, the owner device 100 may transmit, to the digital key sharing device 200, the digital key, and the immobilizer token index mapped to the digital key. In an embodiment, the owner device 100 may transmit, to the digital key sharing device 200, the digital key, and the immobilizer token index mapped to the digital key, through wired or wireless communication.

In operation 250, the digital key sharing device 200 may request the vehicle 10 to grant an authorization to use the vehicle 10. In an embodiment according to the present disclosure, when requesting the vehicle 10 to grant an authorization to use the vehicle 10, the digital key sharing device 200 may transmit the digital key, and the immobilizer token index mapped to the digital key, which have been received from the owner device 100.

In operation 260, the vehicle 10 may validate the digital key received from the digital key sharing device 200. In an embodiment, the vehicle 10 may receive, from the owner device 100, a validation means for validating a digital key, and may verify whether the digital key is valid by using the received validation means. For example, the validation means may include a signature and a certificate of the owner device, and a means for validating the signature and the certificate of the owner device.

In operation 270, in a case where the digital key received from the digital key sharing device 200 is valid, the vehicle 10 may grant the digital key sharing device 200 an authorization to use the vehicle 10, and transmit an immobilizer token to the digital key sharing device 200. In an embodiment according to the present disclosure, in a case where the digital key received from the digital key sharing device 200 is valid, the vehicle 10 may transmit, to the digital key sharing device 200, the authorization to use the vehicle 10, and, upon receipt of a request for the issuance of an immobilizer token based on the authorization to use the vehicle 10, from the digital key sharing device 200, the vehicle 10 may transmit an immobilizer token corresponding to the immobilizer token index mapped to the received digital key.

Then, in operation 280, the digital key sharing device 200 may transmit, to the vehicle 10, a request to start up the vehicle 10. In an embodiment according to the present disclosure, when transmitting the request to start up the vehicle 10, the digital key sharing device 200 may also transmit the immobilizer token received from the vehicle 10.

In operation 290, the vehicle 10 may validate the immobilizer token, and may start up according to the request of the digital key sharing device 200.

According to an embodiment, even if a physical key has been replaced with a digital key, a system for applying an immobilizer which is necessary for starting up a vehicle, to the digital key, and managing the applied immobilizer may be provided. Furthermore, according to an embodiment, by using immobilizer token indices without directly storing immobilizer tokens in the owner device 100, a storage space of the owner device 100 may be more efficiently used.

Figure 3:
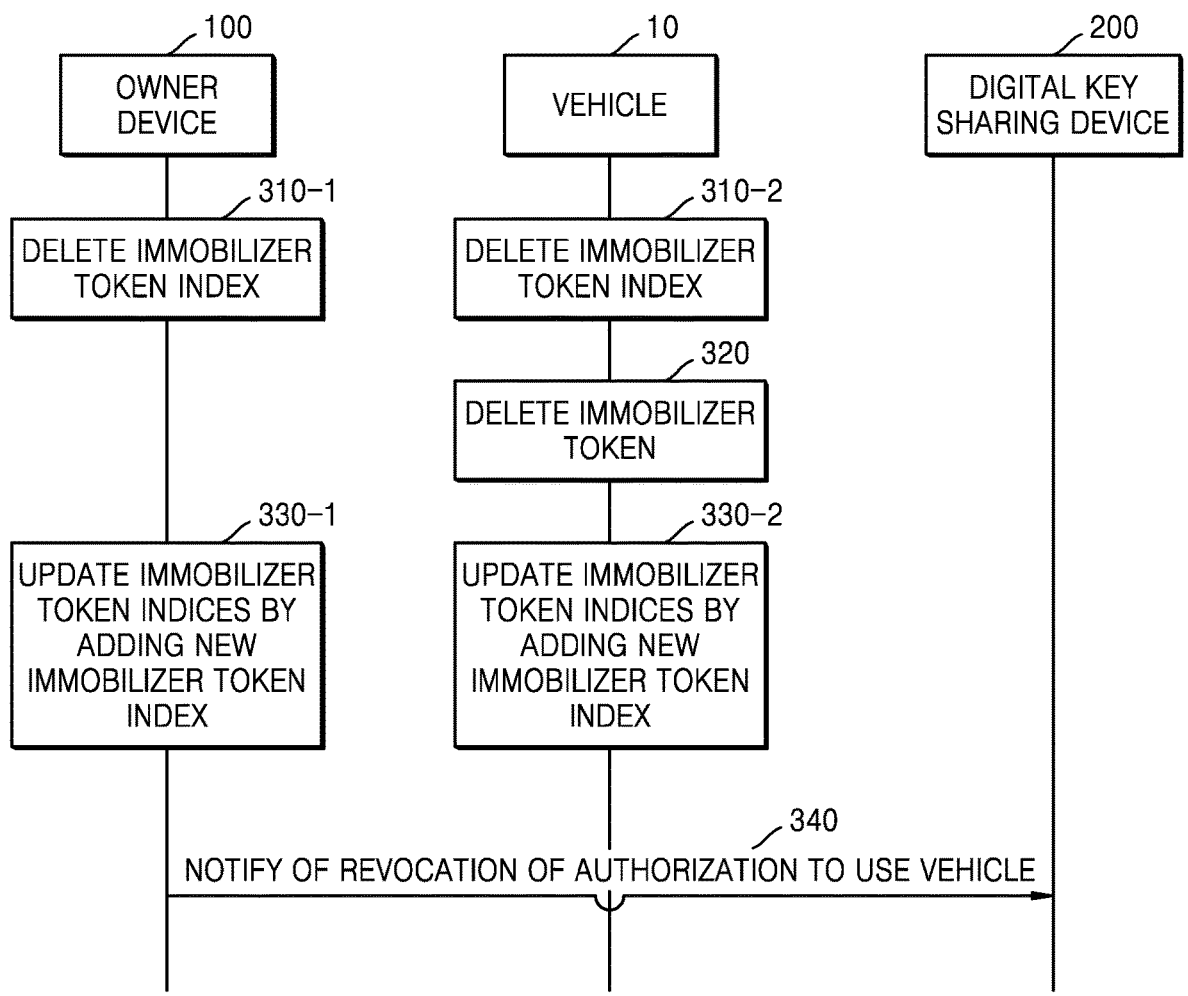
FIG. 3 is a flowchart of a method of deleting an immobilizer token, according to an embodiment.

FIG. 3 is a flowchart of a method of deleting an immobilizer token, according to an embodiment.

FIG. 3 illustrates a method of deleting an immobilizer token, with interactions between an owner device 100, a vehicle 10, and a digital key sharing device 200. As shown in FIG. 2, the owner device 100 is an electronic device of the owner of the vehicle 10, and the digital key sharing device 200 is an electronic device of the another user whom the owner of the vehicle 10 has allowed to use the vehicle 10. FIG. 3 illustrates a process in which the owner of the vehicle 10 revokes the authorization to use of the vehicle 10, that has been granted to the other user.

First, in operations 310-1 and 310-2, the owner device 100 and the vehicle 10 may delete an immobilizer token index of an immobilizer token, of which an authorization to use the vehicle 10 is to be revoked, from immobilizer token indices. This operation may be performed by the owner device 100 or the vehicle 10, or by both the owner device 100 and the vehicle 10. In addition, in an embodiment according to the present disclosure, in a case where the vehicle 10 deletes the immobilizer token index of the immobilizer token, of which the authorization to use is to be revoked, from the immobilizer token indices, the vehicle 10 may delete, in operation 320, the immobilizer token of which the authorization to use is to be revoked. However, this is merely exemplary, and the immobilizer token of which the authorization to be revoked may be first deleted, and the immobilizer token index of the immobilizer token, of which authorization is to be revoked, may be then deleted from immobilizer token indices.

Then, in operations 330-1 and 330-2, the owner device 100 and the vehicle 10 may update their immobilizer token indices by adding a new immobilizer token index. This operation may be performed by a device that has deleted, from immobilizer token indices, an immobilizer token index of an immobilizer token corresponding to an authorization to use the vehicle 10 to be revoked. That is, in a case where the owner device 100 has deleted the immobilizer token index of the immobilizer token corresponding to the authorization to use to be revoked (operation 310-1), the owner device 100 may update its immobilizer token indices by adding a new immobilizer token index (operation 330-1). While, in a case where the vehicle 10 has deleted the immobilizer token index of the immobilizer token corresponding to the authorization to use to be revoked (operation 310-2), the vehicle 10 may update its immobilizer token indices by adding a new immobilizer token index (operation 330-2).

In an embodiment according to the present disclosure, the owner device 100 or the vehicle 10 may add a new immobilizer token index that is incremented by 1 from the highest immobilizer token index among the immobilizer token indices.

In operation 340, the owner device 100 may transmit an authorization revocation notification to the digital key sharing device 200.

According to an embodiment, even if a physical key has been replaced with a digital key, a system for applying an immobilizer which is necessary for starting up a vehicle, to the digital key, and managing the applied immobilizer may be provided. Furthermore, according to an embodiment, by using immobilizer token indices without directly storing immobilizer tokens in the owner device 100, an immobilizer token may be deleted in a simple manner, and thus authorizations to use the vehicle 10 may be more conveniently managed.

Figure 4:
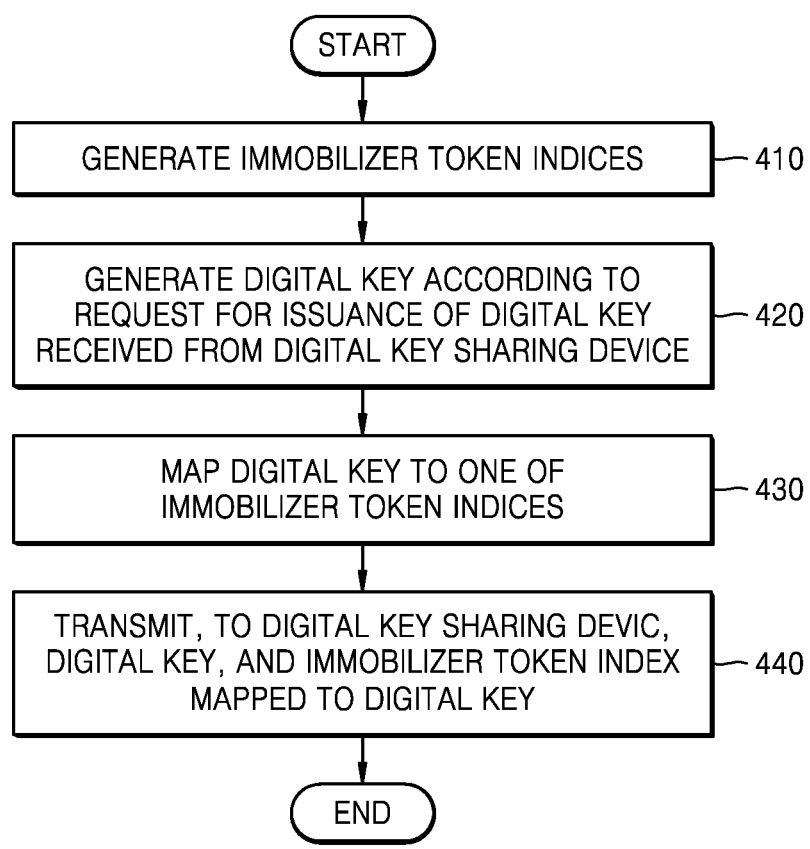
FIG. 4 is a flowchart of an operation method of an owner device, according to an embodiment.

FIG. 4 is a flowchart of an operation method of an owner device, according to an embodiment.

First, in operation 410, the owner device 100 may generate immobilizer token indices. In an embodiment, the owner device 100 may generate the immobilizer token indices of which number is identical to the maximum number of available immobilizer tokens.

Then, in operation 420, the owner device 100 may generate a digital key according to a request for the issuance of a digital key received from the digital key sharing device 200. In an embodiment according to the present disclosure, the owner device 100 may receive a request for the issuance of a digital key from the digital key sharing device 200, and then determine whether to issue a digital key. According to an embodiment, the owner device 100 may issue a digital key to grant the other user an authorization to use the vehicle 10.

In operation 430, the owner device 100 may map the generated digital key to one of the immobilizer token indices. In an embodiment according to the present disclosure, the owner device 100 may map the digital key to an immobilizer token index that is not matched with any digital key and thus is available.

Then, in operation 440, the owner device 100 may transmit, to the digital key sharing device 200, the digital key, and the immobilizer token index mapped to the digital key. In an embodiment according to the present disclosure, the owner device 100 may transmit, to the digital key sharing device 200, the digital key, and the immobilizer token index mapped to the digital key, through wired or wireless communication. In an embodiment according to the present disclosure, the immobilizer token index mapped to the digital key may be contained in information about the digital key, and transmitted to the digital key sharing device 200.

The owner device 100 may also revoke the authorization to use the vehicle 10, that has been granted to the digital key sharing device 200 which is an electronic device of the another user whom the owner of the vehicle 10 has allowed to use the vehicle 10.

In an embodiment according to the present disclosure, the owner device 100 may delete, from the immobilizer token indices, an immobilizer token index of the immobilizer token, of which the authorization to use is to be revoked, and may add, to the immobilizer token indices, a new immobilizer token index that is incremented by 1 from the highest immobilizer token index among the immobilizer token indices.

Figure 5:
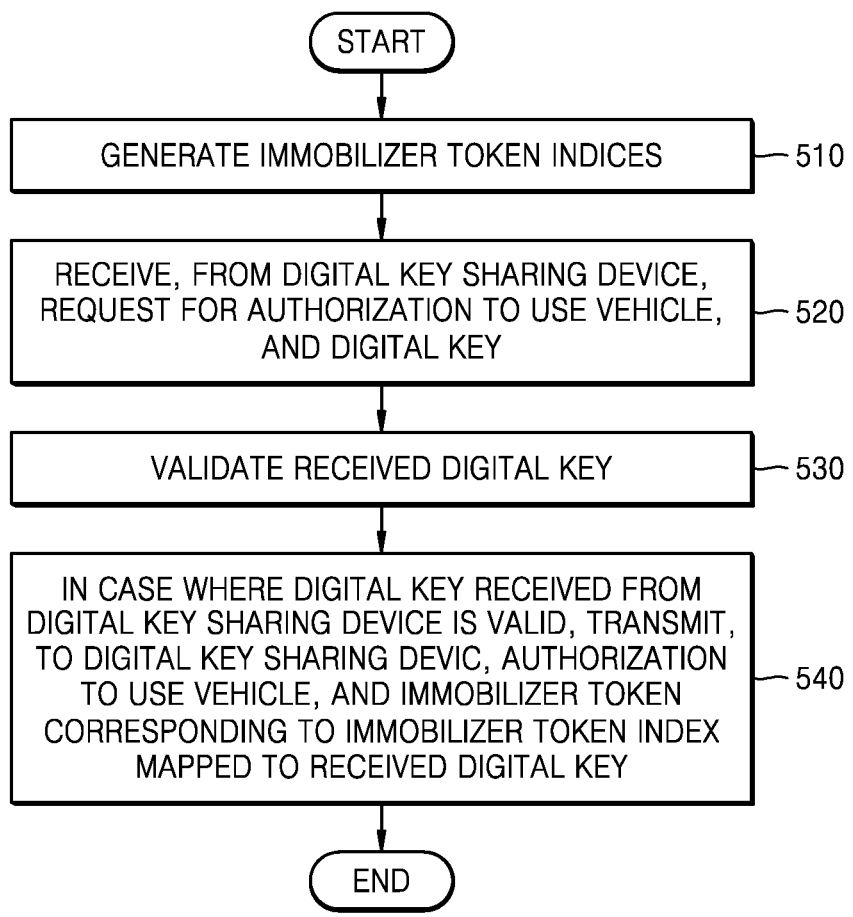
FIG. 5 is a flowchart of an operation method of a vehicle, according to an embodiment.

FIG. 5 is a flowchart of an operation method of a vehicle, according to an embodiment of the present disclosure.

First, in operation 510, the vehicle 10 may generate immobilizer token indices. In an embodiment according to the present disclosure, the vehicle 10 may generate the immobilizer token indices of which number is identical to the maximum number of available immobilizer tokens.

Then, in operation 520, the vehicle 10 may receive, from the digital key sharing device 200, a request for an authorization to use the vehicle 10, and a digital key, and, in operation 530, the vehicle 10 may validate the received digital key. In an embodiment according to the present disclosure, the vehicle 10 may receive, from the owner device 100, a validation means for validating a digital key, and may verify whether the digital key is valid by using the validation means.

In operation 540, in a case where the digital key received from the digital key sharing device 200 is valid, the vehicle 10 may transmit, to the digital key sharing device 200, an authorization to use the vehicle 10, and an immobilizer token corresponding to the immobilizer token index that is mapped to the received digital key. That is, in a case where the digital key received from the digital key sharing device 200 is valid, the vehicle 10 may grant the digital key sharing device 200 the authorization to use the vehicle 10, and transmit the immobilizer token to the digital key sharing device 200. In an embodiment according to the present disclosure, in a case where the digital key received from the digital key sharing device 200 is valid, the vehicle 10 may transmit, to the digital key sharing device 200, the authorization to use the vehicle 10. Then, upon receipt of a request for the issuance of an immobilizer token based on an authorization to use the vehicle 10, from the digital key sharing device 200, the vehicle 10 may transmit the immobilizer token corresponding to the immobilizer token index mapped to the received digital key.

In an embodiment according to the present disclosure, the vehicle 10 may confirm the immobilizer token index mapped to the received digital key, and map, to the digital key sharing device 200, the immobilizer token corresponding to the immobilizer token index mapped to the received digital key.

Although not illustrated in FIG. 5, in an embodiment according to the present disclosure, the vehicle 10 may obtain the immobilizer token corresponding to the immobilizer token index, prior to the transmitting of the immobilizer token to the digital key sharing device 200. In an embodiment according to the present disclosure, the vehicle 10 may generate an immobilizer token or receive an immobilizer token from a server. Here, the server may be a server of the manufacturer of the vehicle 10. In addition, in an embodiment according to the present disclosure, upon receipt of a request for the issuance of an immobilizer token from the digital key sharing device 200, the vehicle 10 may obtain the immobilizer token corresponding to the immobilizer token index. However, the present disclosure is not limited thereto, and the vehicle 10 may obtain the immobilizer token in advance even before receiving the request for the issuance of an immobilizer token from the digital key sharing device 200. For example, the vehicle 10 may obtain the immobilizer token immediately after generating the immobilizer token indices, or upon receipt of a request for an authorization to use the vehicle 10 from the digital key sharing device 200. Here, the vehicle 10 may store immobilizer tokens therein. However, the present disclosure is not limited thereto, and the vehicle 10 may delete an immobilizer token while leaving minimum information for validating a generated digital key, for example, a validation algorithm.

Furthermore, in an embodiment according to the present disclosure, the vehicle 10 may receive, from the digital key sharing device 200, a request to start up the vehicle 10, with the immobilizer token. The vehicle 10 may validate the immobilizer token, and then start up according to the request received from the digital key sharing device 200. In an embodiment according to the present disclosure, the vehicle 10 may validate the immobilizer token received from the digital key sharing device 200 by comparing the immobilizer token with a corresponding immobilizer token stored in the vehicle 10 or by performing a validation algorithm stored in the vehicle 10.

Furthermore, the vehicle 10 may also revoke the authorization to use the vehicle 10, that has been granted to the digital key sharing device 200 which is an electronic device of the another user whom the owner of the vehicle 10 has allowed to use the vehicle 10.

In an embodiment according to the present disclosure, the vehicle 10 may delete, from the immobilizer token indices, an immobilizer token index of the immobilizer token, of which the authorization to use is to be revoked, and may add, to the immobilizer token indices, a new immobilizer token index that is incremented by 1 from the highest immobilizer token index among the immobilizer token indices.

Figure 6:
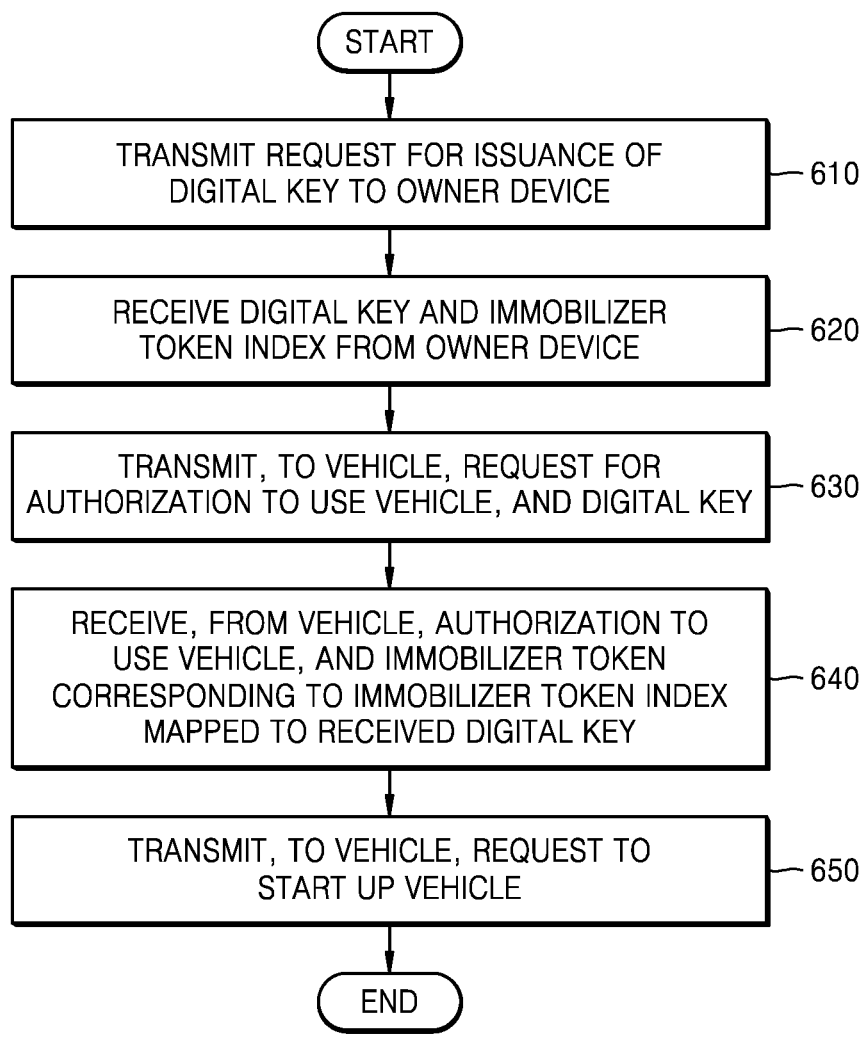
FIG. 6 is a flowchart of an operation method of a digital key sharing device, according to an embodiment.

FIG. 6 is a flowchart of an operation method of a digital key sharing device, according to an embodiment of the present disclosure.

First, in operation 610, the digital key sharing device 200 may transmit a request for the issuance of a digital key, to the owner device 100.

Then, in operation 620, the digital key sharing device 200 may receive, from the owner device 100, a digital key issued to the digital key sharing device 200 or the user of the digital key sharing device 200, and an immobilizer token index mapped to the digital key. In an embodiment according to the present disclosure, the immobilizer token index mapped to the digital key may be contained in information about the digital key, and transmitted to the digital key sharing device 200.

In operation 630, the digital key sharing device 200 may transmit, to the vehicle 10, a request for an authorization to use the vehicle 10, and the digital key received from the owner device 100.

Then, in operation 640, the digital key sharing device 200 may receive, from the vehicle 10, an authorization to use the vehicle 10, and an immobilizer token corresponding to the immobilizer token index mapped to the received digital key. More particularly, after receiving, from the vehicle 10, the authorization to use the vehicle 10, the digital key sharing device 200 may transmit the request for the issuance of an immobilizer token based on the authorization to use the vehicle 10. Then, the digital key sharing device 200 may receive, from the vehicle 10, the immobilizer token corresponding to the immobilizer token index mapped to the received digital key.

In operation 650, the digital key sharing device 200 may transmit, to the vehicle 10, a request to start up the vehicle 10.

Figure 7:
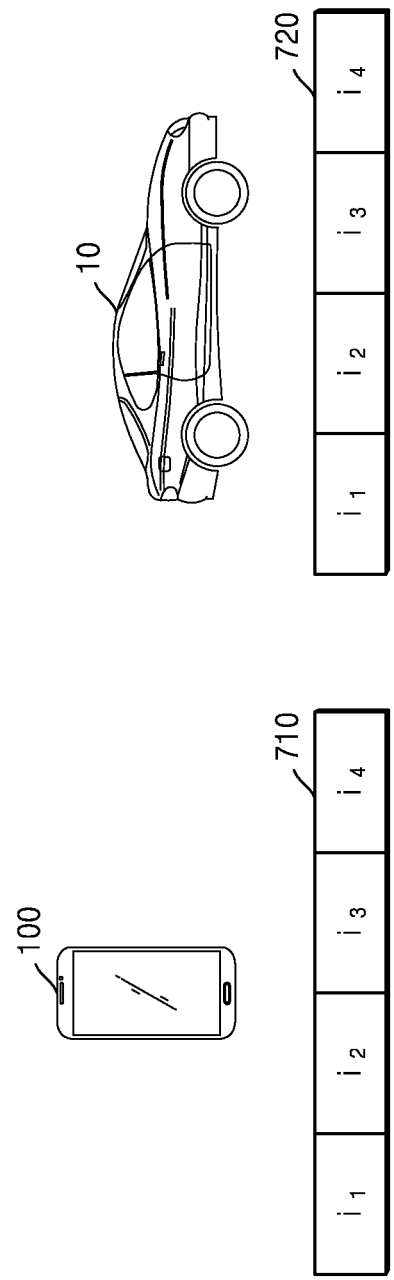
FIG. 7 is a diagram illustrating a mapping relationship between a digital key and an immobilizer token index, according to an embodiment.

FIG. 7 is a diagram illustrating a mapping relationship between a digital key and an immobilizer token index, according to an embodiment of the present disclosure.

As described above, in order to use the vehicle 10, a digital key for verifying an authorization to use the vehicle 10, and an immobilizer token for starting up the vehicle 10 are required. In an embodiment according to the present disclosure, the owner device 100 and the vehicle 10 may generate their immobilizer token indices 710 and 720, respectively, to manage immobilizer tokens. The generated immobilizer token indices may be stored in the owner device 100 and the vehicle 10, respectively.

The owner device 100 and the vehicle 10 may each generate the immobilizer token indices, by generating an array having a length of N, and then inserting integers from 1 to N into the array ($i_1 < i_2 < i_3 < i_4$), where N is the maximum number of immobilizer tokens that may be concurrently used. The integers inserted into the array may be the immobilizer token indices. Here, the maximum number N of immobilizer tokens that may be concurrently used is not the maximum number of immobilizer tokens that may be granted by the owner of the vehicle 10 who is also the user of the owner device 100, but is the maximum number of immobilizer tokens that may be concurrently granted to other users by the owner of the vehicle 10. For example, as shown in FIG. 7, in a case where N is 4, and the owner of the vehicle 10 has granted immobilizer tokens corresponding to indices 1, 2, 3, and 4, the owner of the vehicle 10 may not further grant a new immobilizer token without revoking any one of the granted immobilizer tokens. For example, in a case where the owner of the vehicle 10 has revoked authorizations of the immobilizer tokens corresponding to the indices 1 and 3, the owner of the vehicle 10 may grant two new immobilizer tokens. The maximum number N of immobilizer tokens may be configured, considering the capacity of a storage space and the ease of the management of immobilizer tokens.

In an embodiment according to the present disclosure, after generating digital keys, the owner device 100 may map indices $i_1$, $i_2$, $i_3$, and $i_4$ of the immobilizer token indices 710, to the generated digital keys.

In a case where both the maximum number of immobilizer tokens, that is, the highest immobilizer token index, and the number of generated digital keys are four, the immobilizer token indices and the generated digital keys may be mapped in a one-to-one manner, but the present disclosure is not limited thereto, and the highest immobilizer token index may be less than or greater than the number of the generated digital keys. In this case, the immobilizer token indices and the generated digital keys may not necessarily be mapped in a one-to-one manner.

Figure 8:
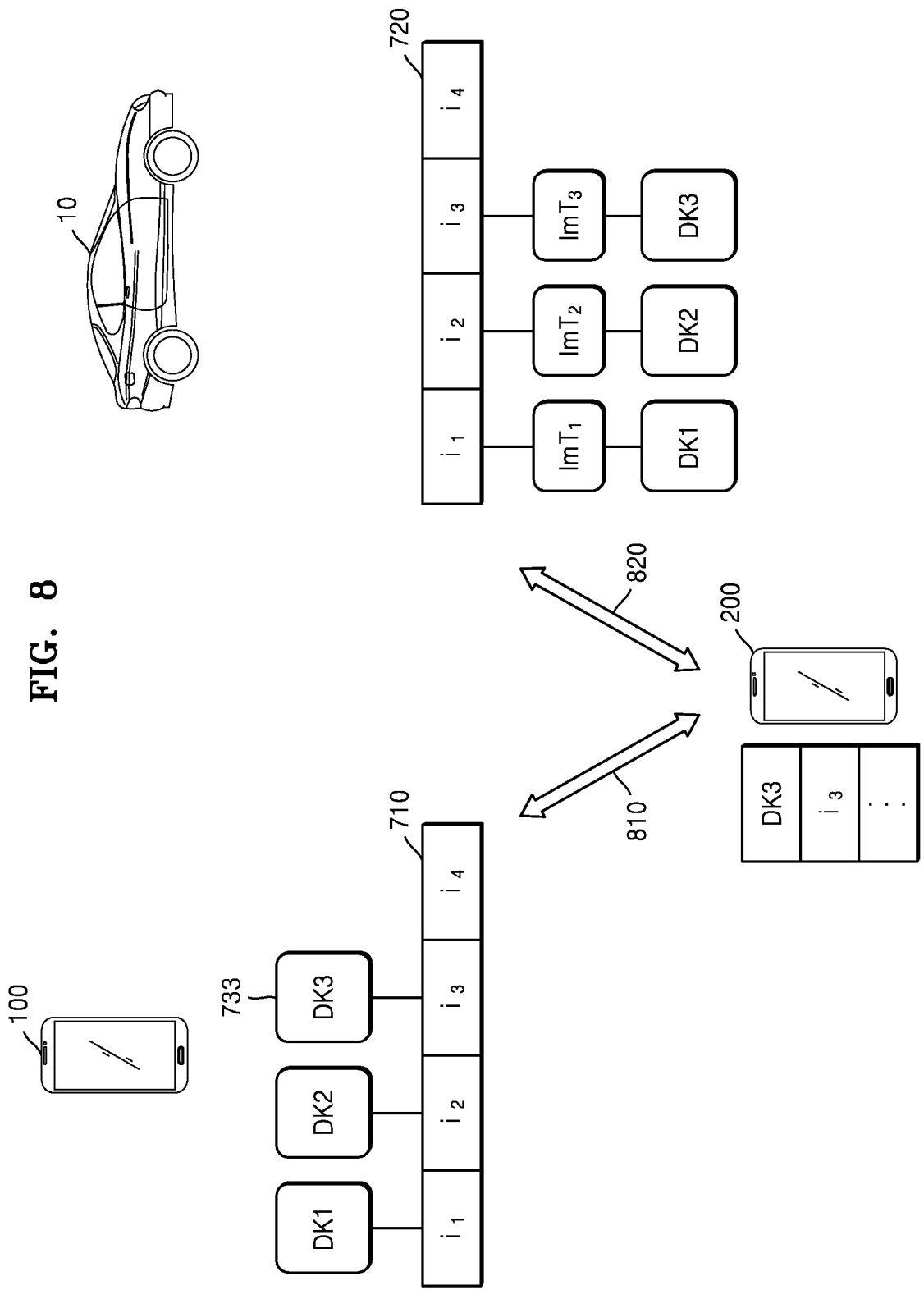
FIG. 8 is a diagram illustrating a process of using a digital key and an immobilizer token, according to an embodiment.

FIG. 8 is a diagram illustrating a process of using a digital key and an immobilizer token, according to an embodiment of the present disclosure.

The owner device 100 may transmit, to the digital key sharing device 200, the digital key, and the immobilizer token index mapped to the digital key. By performing this process, the owner device 100 may grant the another user an authorization to use the vehicle 10.

Referring to FIG. 8, upon receipt of a request for the issuance of a digital key from the digital key sharing device 200, the owner device 100 may transmit, to the digital key sharing device 200, a digital key DK3 733, and an immobilizer token index mapped to the digital key DK3 733 (810). Here, the immobilizer token index $i_3$ corresponding to an immobilizer token may be contained in information about the digital key DK3 733, and transmitted to the digital key sharing device 200 (810).

After receiving the digital key DK3 733, and the immobilizer token index $i_3$ corresponding to the immobilizer token mapped to the digital key DK3 733, the digital key sharing device 200 may transmit, to the vehicle 10, the digital key DK3 733, and a request for an authorization to use the vehicle 10. Upon receipt of the digital key DK3 733 and the request for an authorization to use the vehicle 10, the vehicle 10 may validate the received digital key DK3 733. Here, the vehicle 10 may perform the validation by using the validation means received from the owner device 100, and, in a case where the digital key DK3 733 is valid, the vehicle 10 may map the digital key sharing device 200 to the immobilizer token index $i_3$, and grant the digital key sharing device 200 an authorization to use the vehicle 10. Then, in a case where the vehicle 10 has received a request for the issuance of an immobilizer token from the digital key sharing device 200 based on the authorization to use the vehicle 10, the vehicle 10 may transmit, to the digital key sharing device 200, an immobilizer token $ImT_3$ corresponding to the immobilizer token index $i_3$ mapped to the digital key sharing device 200. The digital key sharing device 200 may store the received immobilizer token $ImT_3$ (820).

In an embodiment of the present disclosure, the vehicle 10 may obtain the immobilizer token either upon, or in advance prior to, the receipt of the request for the issuance of an immobilizer token from the digital key sharing device 200. The vehicle 10 may generate the immobilizer token, or may receive the immobilizer token from the server. Here, the server may be a server of the manufacturer of the vehicle 10.

By performing this process, a user may use the vehicle 10 by using the digital key DK3 733 and the immobilizer token $ImT_3$.

Figure 9:
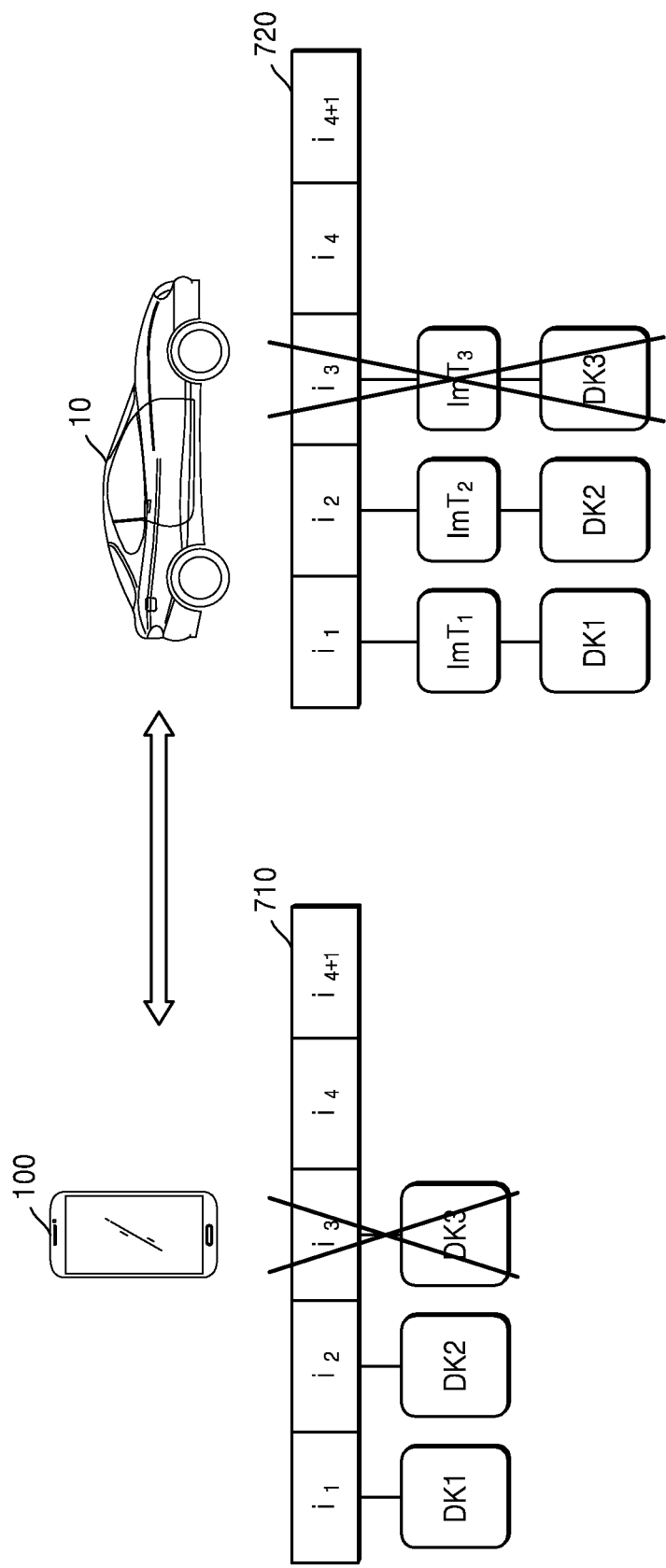
FIG. 9 is a diagram illustrating a process of deleting an immobilizer token index, according to an embodiment.

FIG. 9 is a diagram illustrating a process of deleting an immobilizer token index, according to an embodiment of the present disclosure.

The owner device 100 may revoke an authorization to use the vehicle 10 that has been granted to the digital key sharing device 200 or the user of the digital key sharing device 200. In an embodiment of the present disclosure, the owner device 100 may delete, from the immobilizer token indices, an immobilizer token index of the immobilizer token, of which the authorization to use is to be revoked, and may add, to the immobilizer token indices, a new immobilizer token index that is incremented by 1 from the highest immobilizer token index among the immobilizer token indices. The vehicle 10 may also perform the same process.

Referring to FIG. 9, the owner device 100 may revoke the authorization to use the vehicle 10, corresponding to the immobilizer token index is among the immobilizer token indices. The owner device 100 may delete the immobilizer token index $i_3$, and may add a new immobilizer token index $i_{4+1}$ that is incremented by 1 from the highest immobilizer token index $i_4$ among the immobilizer token indices 710. As described above, by deleting one immobilizer token index $i_3$ and adding the new immobilizer token index $i_{4+1}$, a new immobilizer token index to be mapped may be prevented from being a duplicate index. Therefore, according to an embodiment of the present disclosure, the immobilizer tokens may be managed by managing the immobilizer token indices.

As described above, in a case where the owner device 100 has revoked the authorization to use the vehicle 10 granted to the digital key sharing device 200 or the user of the digital key sharing device 200, the owner device 100 may easily prevent a user who had granted the revoked authorization from using the vehicle 10. More particularly, because the immobilizer token index corresponding to the immobilizer token owned by the user who had granted the revoked authorization is not included in the current immobilizer token indices, the user may be easily confirmed to have a revoked authorization.

Figure 10:
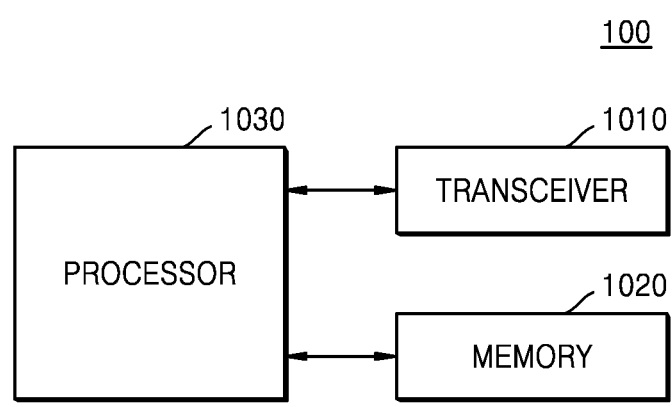
FIG. 10 is a block diagram illustrating a configuration of an owner device, according to an embodiment.

FIG. 10 is a block diagram illustrating a configuration of an owner device, according to an embodiment of the present disclosure.

As shown in FIG. 10, the owner device 100 according to an embodiment of the present disclosure may include a transceiver 1010, a memory 1020, and a processor 1030. However, the constituent elements of the owner device 100 are not limited to the aforementioned examples. The owner device 100 may include more or less constituent elements than the aforementioned constituent elements. For example, the owner device 100 may further include an input unit for receiving a user input, or a display unit for displaying immobilizer token management-related information. In addition, the transceiver 1010, the memory 1020, and the processor 1030 may be implemented as a single chip, or a plurality of processors 1030 may be provided.

The transceiver 1010 may transmit and receive signals to and from an external device. The signal to be transmitted and received to and from the external device may include control information and data. The external device may include the vehicle 10, the digital key sharing device 200, or the like. The transceiver 1010 may include an RF transmitter for modulating and amplifying a frequency of a signal to be transmitted, and an RF receiver for low-noise-amplifying a received signal and demodulating a frequency. However, this is merely exemplary, and the constituent elements of the transceiver 1010 are not limited to the RF transmitter and the RF receiver. In addition, the transceiver 1010 may receive a signal through a wireless channel and output the signal to the processor 1030, and may transmit a signal output from the processor 1030 through the wireless channel.

Furthermore, the transceiver 1010 may include a communication module for short-range communication. For example, the transceiver 1010 may include a communication module for performing various short-range communication schemes, such as infrared communication, magnetic secure transmission (MST), or magnetic security communication, in addition to Wi-Fi, Wi-Fi Direct, Bluetooth, or NFC.

The memory 1020 may store a program and data required for operation of the owner device 100. In an embodiment of the present disclosure, the memory 1020 may store control information or data included in a signal transmitted from or received by the owner device 100. The memory 1020 may include any or a combination of storage media such as ROM, RAM, a hard disk, a CD-ROM, or a DVD. A plurality of memories 1020 may be provided. According to an embodiment of the present disclosure, the memory 1020 may store a program for performing the operation for managing immobilizer tokens according to the embodiments.

The processor 1030 may control a series of operations of the owner device 100 according to the embodiments of the present disclosure. For example, the constituent elements of the owner device 100 may be controlled to perform the operation of the owner device 100 according to an embodiment of the present disclosure. A plurality of processors 1030 may be provided, and the processor 1030 may perform the operation of the owner device 100 by executing a program stored in the memory 1020.

In an embodiment of the present disclosure, the processor 1030 may generate immobilizer token indices, generate a digital key according to a request for the issuance of a digital key received from the digital key sharing device 200, map the digital key to one of the immobilizer token indices, and transmit, to the digital key sharing device 200, the digital key and the immobilizer token index mapped to the digital key.

In an embodiment of the present disclosure, the number of the immobilizer token indices generated by the processor 1030 may be identical to the maximum number of available immobilizer tokens. In addition, the processor 1030 may map a digital key to an immobilizer token index that is not matched with any digital key and thus is available. In an embodiment of the present disclosure, the processor 1030 may transmit, to the vehicle 10, a validation means for validating a digital key.

Figure 11:
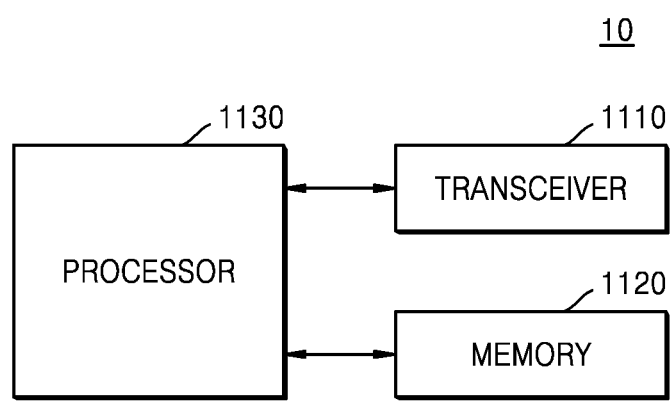
FIG. 11 is a block diagram illustrating a configuration of a vehicle, according to an embodiment.

In an embodiment of the present disclosure, the processor 1030 may delete, from the immobilizer token indices, an immobilizer token index of the immobilizer token, of which the authorization to use is to be revoked, and may add, to the immobilizer token indices, a new immobilizer token index that is incremented by 1 from the highest immobilizer token index among the immobilizer token indices, thereby updating the immobilizer token indices, FIG. 11 is a block diagram illustrating a configuration of a vehicle, according to an embodiment of the present disclosure.

As shown in FIG. 11, the vehicle 10 may include a transceiver 1110, a memory 1120, and a processor 1130. However, the constituent elements of the vehicle 10 are not limited to the aforementioned examples. The vehicle 10 may include more or less constituent elements than the aforementioned constituent elements. For example, the vehicle 10 may further include constituent elements of a drive system, an input unit for receiving a user input, or a display unit for displaying immobilizer token management-related information. In addition, the transceiver 1110, the memory 1120, and the processor 1130 may be implemented as a single chip, or a plurality of processors 1130 may be provided.

The transceiver 1110 may transmit and receive signals to and from an external device. The signal to be transmitted and received to and from the external device may include control information and data. The external device may include the owner device 100, the digital key sharing device 200, or the like. The transceiver 1110 may include an RF transmitter for modulating and amplifying a frequency of a signal to be transmitted, and an RF receiver for low-noise-amplifying a received signal and demodulating a frequency. However, this is merely exemplary, and the constituent elements of the transceiver 1110 are not limited to the RF transmitter and the RF receiver. In addition, the transceiver 1110 may receive a signal through a wireless channel and output the signal to the processor 1130, and may transmit a signal output from the processor 1130 through the wireless channel.

Furthermore, the transceiver 1110 may include a communication module for short-range communication. For example, the transceiver 1110 may include a communication module for performing various short-range communication schemes, such as infrared communication, magnetic secure transmission (MST), or magnetic security communication, in addition to Wi-Fi, Wi-Fi Direct, Bluetooth, or NFC.

The memory 1120 may store a program and data required for operation of the vehicle 10. In an embodiment of the present disclosure, the memory 1120 may store control information or data included in a signal transmitted from or received by the vehicle 10. The memory 1120 may include any or a combination of storage media such as ROM, RAM, a hard disk, a CD-ROM, or a DVD. A plurality of memories 1120 may be provided. According to an embodiment of the present disclosure, the memory 1120 may store a program for performing the operation for managing immobilizer tokens according to the embodiments.

The processor 1130 may control a series of operations of the vehicle 10 according to the embodiments of the present disclosure. For example, the constituent elements of the vehicle 10 may be controlled to perform the operation of the vehicle 10 according to an embodiment of the present disclosure. A plurality of processors 1130 may be provided, and the processor 1130 may perform the operation of the vehicle 10 by executing a program stored in the memory 1120.

In an embodiment of the present disclosure, the processor 1130 may generate immobilizer token indices, receive, from the digital key sharing device 200, a digital key and a request for an authorization to use the vehicle 10, validate the received digital key, and, in a case where the received digital key is valid, transmit, to the digital key sharing device 200, an authorization to use the vehicle 10 and an immobilizer token corresponding to the immobilizer token index mapped to the authorization to use the vehicle 10.

In an embodiment of the present disclosure, the number of the immobilizer token indices generated by the processor 1130 may be identical to the maximum number of available immobilizer tokens. In addition, the processor 1130 may receive, from the owner device 100, a validation means for validating a digital key, and may verify whether the digital key is valid by using the validation means.

In an embodiment of the present disclosure, the processor 1130 may confirm the immobilizer token index mapped to the received digital key, and map, to the digital key sharing device 200, the immobilizer token corresponding to the immobilizer token index mapped to the received digital key. In addition, the processor 1130 may transmit, to the digital key sharing device 200, an authorization to use the vehicle 10, receive, from the digital key sharing device 200, a request for the issuance of an immobilizer token based on the authorization, and transmit an immobilizer token corresponding to the immobilizer token index mapped to the received digital key, according to the request for the issuance of an immobilizer token.

In an embodiment, the processor 1130 may obtain the immobilizer token corresponding to the immobilizer token index. More particularly, the processor 1130 may generate an immobilizer token by itself, or may receive an immobilizer token from the server, and may map the generated or received immobilizer token to one of the immobilizer token indices. In addition, upon receipt of a request for the issuance of an immobilizer token from the digital key sharing device 200, the processor 1130 may obtain the immobilizer token corresponding to the immobilizer token index.

In an embodiment of the present disclosure, the processor 1130 may delete, from the immobilizer token indices, an immobilizer token index of the immobilizer token, of which the authorization to use is to be revoked, and may add, to the immobilizer token indices, a new immobilizer token index that is incremented by 1 from the highest immobilizer token index among the immobilizer token indices, thereby updating the immobilizer token indices. In addition, the processor 1130 may delete an immobilizer token of which the authorization to use the vehicle 10 is to be revoked.

In an embodiment of the present disclosure, the processor 1130 may receive, from the digital key sharing device 200, a request to start up the vehicle 10, and an immobilizer token, validate the immobilizer token, and, in a case where the immobilizer token is valid, start up the vehicle 10. Furthermore, the processor 1130 may validate the immobilizer token received from the digital key sharing device 200 by comparing the immobilizer token with a corresponding immobilizer token stored in the vehicle 10, or by performing a validation algorithm stored in the vehicle 10.

Figure 12:
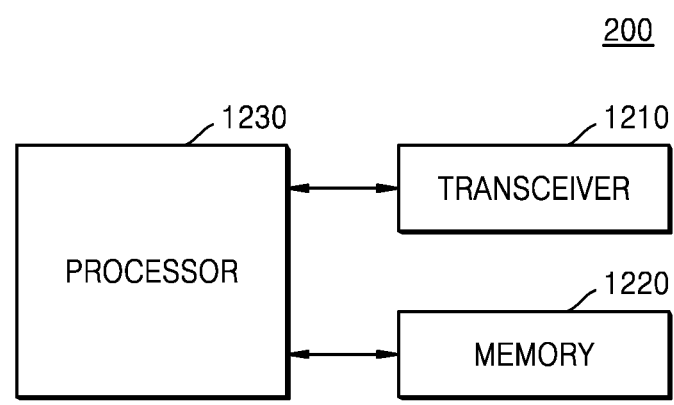
FIG. 12 is a block diagram illustrating a configuration of a digital key sharing device, according to an embodiment.

FIG. 12 is a block diagram illustrating a configuration of a digital key sharing device, according to an embodiment of the present disclosure.

As shown in FIG. 12, the digital key sharing device 200 may include a transceiver 1210, a memory 1220, and a processor 1230. However, the constituent elements of the digital key sharing device 200 are not limited to the aforementioned examples. The digital key sharing device 200 may include more or less constituent elements than the aforementioned constituent elements. For example, the digital key sharing device 200 may further include an input unit for receiving a user input, or a display unit for displaying immobilizer token management-related information. In addition, the transceiver 1210, the memory 1220, and the processor 1230 may be implemented as a single chip, or a plurality of processors 1230 may be provided.

The transceiver 1210 may transmit and receive signals to and from an external device. The signal to be transmitted and received to and from the external device may include control information and data. The external device may include the vehicle 10, the digital key sharing device 200, or the like. The transceiver 1210 may include an RF transmitter for modulating and amplifying a frequency of a signal to be transmitted, and an RF receiver for low-noise-amplifying a received signal and demodulating a frequency. However, this is merely exemplary, and the constituent elements of the transceiver 1210 are not limited to the RF transmitter and the RF receiver. In addition, the transceiver 1210 may receive a signal through a wireless channel and output the signal to the processor 1230, and may transmit a signal output from the processor 1230 through the wireless channel.

Furthermore, the transceiver 1210 may include a communication module for short-range communication. For example, the transceiver 1210 may include a communication module for performing various short-range communication schemes, such as infrared communication, magnetic secure transmission (MST), or magnetic security communication, in addition to Wi-Fi, Wi-Fi Direct, Bluetooth, or NFC.

The memory 1220 may store a program and data required for operation of the digital key sharing device 200. In an embodiment of the present disclosure, the memory 1220 may store control information or data included in a signal transmitted from or received by the digital key sharing device 200. The memory 1220 may include any or a combination of storage media such as ROM, RAM, a hard disk, a CD-ROM, or a DVD. A plurality of memories 1220 may be provided. According to an embodiment of the present disclosure, the memory 1220 may store a program for performing the operation for managing immobilizer tokens according to the embodiments.

The processor 1230 may control a series of operations of the digital key sharing device 200 according to the embodiments of the present disclosure. For example, the constituent elements of the digital key sharing device 200 may be controlled to perform the operation of the digital key sharing device 200 according to an embodiment of the present disclosure. A plurality of processors 1230 may be provided, and the processor 1230 may perform an operation of the digital key sharing device 200 by executing a program stored in the memory 1220.

In an embodiment of the present disclosure, the processor 1230 may transmit, to the owner device 100, a request for the issuance of a digital key, receive, from the owner device 100, a digital key issued to the digital key sharing device 200 or the user of the digital key sharing device 200, and an immobilizer token index mapped to the digital key, transmit, to the vehicle 10, a request for an authorization to use the vehicle 10, and the digital key received from the owner device 100, receive, from the vehicle 10, an authorization to use the vehicle 10, and an immobilizer token corresponding to the immobilizer token index mapped to the received digital key, and transmit, to the vehicle 10, a request to start up the vehicle 10.

The methods according to various embodiments of the present disclosure as described herein or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product may be configured for execution by one or more processors in an electronic device. The one or more programs may include instructions directing the electronic device to perform the methods according to various embodiments of the present disclosure as described herein or in the following claims.

The programs (e.g., software modules or software) may be stored in non-volatile memory including RAM or flash memory, read only memory (ROM), electrically erasable programmable read only memory (EEPROM), a magnetic disc storage device, a compact disc-ROM (CD-ROM), a digital versatile disc (DVD) or another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing embodiments of the present disclosure. Furthermore, a separate storage device on a communication network may access the device for performing embodiments of the present disclosure.

In the embodiments of the present disclosure, constituent elements included in the present disclosure are expressed in a singular form or plural form depending on the described embodiments of the present disclosure. However, the singular form or plural form is selected appropriately for a situation presented for convenience of description and the present disclosure is not limited to the singular or plural form, and a constituent element expressed in a singular form may include a plurality of constituent elements, and constituent elements expressed in a plural form may include a single constituent element.

It should be understood that the embodiments of the present disclosure described herein should be considered in a descriptive sense only, and not for purposes of limitation. That is, it will be understood by one of skill in the art that various changes in form and details may be made therein without departing from the spirit and scope of the present disclosure. Also, the embodiments of the present disclosure may be combined and operated according to needs. For example, parts of an embodiment and another embodiment of the present disclosure may be combined. Also, other modifications based on the technical scope of the embodiments of the present disclosure may be applied even to, for example, an LTE system, a 5G system, and an NR system.

The invention claimed is:

1. An operation method of a vehicle, the operation method comprising:
   generating immobilizer token indices for a plurality of immobilizer tokens, wherein a first immobilizer token index among the immobilizer token indices is assigned for a digital key sharing device;
   deleting a digital key of the digital key sharing device associated with the first immobilizer token index; and
   assigning a new immobilizer token index which is incremented by 1 from a highest index among the immobilizer token indices.

2. The operation method of claim 1, further comprising receiving, from the digital key sharing device, the immobilizer token for the first immobilizer token index.

3. The operation method of claim 1, further comprising: deleting the first immobilizer token index.

4. The operation method of claim 3, further comprising deleting the immobilizer token for the first immobilizer token index.

5. An operation method of an owner device, the operation method comprising:
   storing immobilizer token indices for a plurality of immobilizer tokens, wherein a first immobilizer token index among the immobilizer token indices is assigned for a digital key sharing device;
   receiving, from the digital key sharing device, a request for issuance of a digital key;
   mapping a digital key to the first immobilizer token index; and
   adding a new immobilizer token index which is incremented by 1 from a highest index among the immobilizer token indices.

6. An owner device comprising
   a transceiver;
   a memory storing a program and data for managing immobilizer tokens; and
   a processor configured to execute the program stored in the memory to
   store immobilizer token indices for a plurality of immobilizer tokens, wherein a first immobilizer token index among the immobilizer token indices is assigned for a digital key sharing device, receive, from the digital key sharing device, a request for issuance of a digital key, map a digital key to the first immobilizer token index, and add a new immobilizer token index which is incremented by 1 from a highest index among the immobilizer token indices.

* * * * *